US011168985B2

United States Patent
Slutsky et al.

(10) Patent No.: US 11,168,985 B2
(45) Date of Patent: Nov. 9, 2021

(54) VEHICLE POSE DETERMINING SYSTEM AND METHOD

(71) Applicant: GM GLOBAL TECHNOLOGY OPERATIONS LLC, Detroit, MI (US)

(72) Inventors: Michael Slutsky, Kfar Saba (IL); Daniel I. Dobkin, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 16/371,365

(22) Filed: Apr. 1, 2019

(65) Prior Publication Data
US 2020/0309530 A1    Oct. 1, 2020

(51) Int. Cl.
| | |
|---|---|
| G01C 21/16 | (2006.01) |
| G01S 13/931 | (2020.01) |
| G01S 13/89 | (2006.01) |
| G06T 7/70 | (2017.01) |
| G01S 13/93 | (2020.01) |

(52) U.S. Cl.
CPC ............ G01C 21/165 (2013.01); G01S 13/89 (2013.01); G01S 13/931 (2013.01); G06T 7/70 (2017.01); *G01S 2013/932* (2020.01); *G06T 2207/30244* (2013.01); *G06T 2207/30252* (2013.01)

(58) Field of Classification Search
CPC ......... G01C 21/16; G01S 13/93; G01S 13/89; G06T 7/70
See application file for complete search history.

(56) References Cited

U.S. PATENT DOCUMENTS

| | | | |
|---|---|---|---|
| 2017/0285161 A1* | 10/2017 | Izzat | G01S 13/931 |
| 2018/0231654 A1 | 8/2018 | Bilik et al. | |
| 2019/0049580 A1* | 2/2019 | Natroshvili | G01S 17/89 |
| 2019/0258878 A1* | 8/2019 | Koivisto | G05D 1/00 |
| 2019/0279049 A1* | 9/2019 | Doria | G06K 9/00798 |
| 2020/0249674 A1* | 8/2020 | Dally | G06N 3/08 |

* cited by examiner

*Primary Examiner* — Tan Q Nguyen
(74) *Attorney, Agent, or Firm* — Cantor Colburn LLP

(57) ABSTRACT

A vehicle pose determining system and method for accurately estimating the pose of a vehicle (i.e., the location and/or orientation of a vehicle). The system and method use a form of sensor fusion, where output from vehicle dynamics sensors (e.g., accelerometers, gyroscopes, encoders, etc.) is used with output from vehicle radar sensors to improve the accuracy of the vehicle pose data. Uncorrected vehicle pose data derived from dynamics sensor data is compensated with correction data that is derived from occupancy grids that are based on radar sensor data. The occupancy grids, which are 2D or 3D mathematical objects that are somewhat like radar-based maps, must correspond to the same geographic location. The system and method use mathematical techniques (e.g., cost functions) to rotate and shift multiple occupancy grids until a best fit solution is determined, and the best fit solution is then used to derive the correction data that, in turn, improves the accuracy of the vehicle pose data.

19 Claims, 5 Drawing Sheets

VEHICLE POSE DETERMINING SYSTEM AND METHOD

TECHNICAL FIELD

The exemplary embodiments described herein generally relate to a system and method for use in a vehicle and, more particularly, to a vehicle pose determining system and method that can accurately estimate the pose of a vehicle (i.e., the location and/or orientation of a vehicle).

INTRODUCTION

Modern vehicles oftentimes need data relating to the geographic location and/or orientation of the vehicle (i.e., the pose of the vehicle). For example, autonomous vehicles and autonomous vehicle systems typically rely on such data to carry out certain self-driving operations and the like. The accuracy of such data, particularly if it is exclusively generated by odometry- and/or GPS-based equipment, can be negatively impacted by errors in linear and angular vehicle dynamics measurements. These errors can accumulate over time and can result in undesirable drifts in the vehicle pose data.

One potential way to improve the accuracy of the vehicle pose data is to use carrier-phase enhancement type of GPS (CPGPS) equipment. However, as understood by those skilled in the art, this type of GPS equipment is currently prohibitively expensive to install on individual vehicles intended for the retail market. It is preferable to improve the accuracy of vehicle pose data through the use of existing equipment that is already installed on the vehicle and, thus, will not substantially increase the cost of the vehicle.

The vehicle pose determining system and method disclosed herein are designed to address these issues.

SUMMARY

According to one aspect, there is provided a vehicle pose determining method for use with a vehicle having one or more vehicle sensor(s), the method may comprise the steps of: gathering sensor data from the vehicle sensor(s); generating occupancy grid data from the sensor data, the occupancy grid data includes a plurality of occupancy grids, each occupancy grid includes a plurality of individual cells, and each cell is assigned a probability that represents the likelihood that an object occupies a space associated with that particular cell; deriving correction data from the occupancy grid data; and determining corrected vehicle pose data from the correction data, wherein the corrected vehicle pose data is representative of a location and/or an orientation of the vehicle and has been corrected to address a drift or error in the vehicle pose data.

According to various embodiments, the pose determining method may further include any one of the following features or any technically-feasible combination of some or all of these features:

the gathering step further comprises gathering radar sensor data from one or more vehicle radar sensor(s) and providing the radar sensor data to a vehicle data processing module over a vehicle communications network, and the radar sensor data includes information relating to radar signals that have been reflected off of one or more object(s) near the vehicle;

the generating step further comprises generating occupancy grid data from the sensor data and storing the occupancy grid data including the plurality of occupancy grids in a memory device located on the vehicle, and each occupancy grid is a 2D or 3D mathematical structure or object that includes a distribution of probabilities representative of a scene near the vehicle;

the generating step further comprises assigning an initial probability to each of the plurality of individual cells, and then adjusting the initial probability of each cell up or down based on whether the sensor data indicates that it is more likely or less likely that an object occupies the space associated with that particular cell;

the deriving step further comprises first identifying two or more occupancy grids that are representative of the same geographic location or scene and are good candidates for deriving the correction data, and then using the two or more occupancy grids to derive the correction data;

the identifying step further comprises evaluating a candidate frame from occupancy grid data generated in the generating step against a historic frame from occupancy grid data previously saved, and identifying the candidate frame and the historic frame as good candidates for deriving correction data when a data frame correlation satisfies a correlation threshold;

the deriving step further comprises finding a mathematical solution that represents the least amount of error between two or more occupancy grids that are representative of the same geographic location or scene, and using the solution to derive the correction data;

the deriving step uses a cost function to find the mathematical solution that represents the least amount of error between the two or more occupancy grids, and the cost function is selected from the group consisting of: a normalized cross correlation (NCC) cost function, a sum of square distances (SSD) cost function, or a sum of absolute distances (SAD) cost function;

the correction data includes a translational correction, a rotational correction, or both;

the determining step further comprises determining corrected vehicle pose data by applying the correction data to a previous vehicle pose estimate;

the corrected vehicle pose data includes a smaller drift or error than the previous vehicle pose estimate;

further comprising the steps of: gathering dynamics sensor data with one or more vehicle dynamics sensor(s); and estimating an initial vehicle pose from the dynamics sensor data, and the initial vehicle pose estimate is provided in the form of uncorrected vehicle pose data; wherein the determining step further comprises determining corrected vehicle pose data by applying the correction data to the uncorrected vehicle pose data;

the dynamics sensor data gathering step further comprises gathering dynamics sensor data from the vehicle dynamics sensor(s) and providing the dynamics sensor data to a vehicle data processing module over a vehicle communications network, and the dynamics sensor data includes information relating to linear, angular and/or other forms of vehicle dynamics measurements;

the vehicle dynamics sensor(s) include at least one sensor selected from the group consisting of: an accelerometer, a gyroscope, or an encoder;

the method uses sensor fusion to combine the dynamics sensor data with the sensor data in order to reduce the drift or error in the vehicle pose data;

further comprising the step of: automatically controlling one or more vehicle actuator(s) with a vehicle electronic module, wherein the vehicle electronic module controls the vehicle actuator(s) with instructions based on the corrected vehicle pose data;

the vehicle electronic module is selected from the group consisting of: an engine control module, a steering control module, or a brake control module.

According to another aspect, there is provided a vehicle pose determining method for use with a vehicle having one or more vehicle dynamics sensor(s), one or more vehicle radar sensor(s) and a data processing module, the method may comprise the steps of: gathering dynamics sensor data with the vehicle dynamics sensor(s); estimating an initial vehicle pose from the dynamics sensor data, and providing the initial vehicle pose estimate to the data processing module in the form of uncorrected vehicle pose data; gathering radar sensor data with the vehicle radar sensor(s); sending the radar sensor data to the data processing module; generating occupancy grid data from the radar sensor data at the data processing module, the occupancy grid data includes a plurality of occupancy grids, each occupancy grid includes a plurality of individual cells, and each cell is assigned a probability that represents the likelihood that an object occupies a space associated with that particular cell; deriving correction data from the occupancy grid data at the data processing module; and determining corrected vehicle pose data from the correction data, wherein the corrected vehicle pose data is representative of a location and/or an orientation of the vehicle and has been corrected to address a drift or error in the vehicle pose data.

According to another aspect, there is provided a vehicle pose determining system for use with a vehicle, comprising: one or more vehicle sensor(s) that are mounted on the vehicle and provide sensor data; a vehicle data processing module that is mounted on the vehicle and is coupled to the vehicle sensor(s) to receive the sensor data; and a computer program product configured for installation on the vehicle data processing module, wherein the computer program product includes electronic instructions that, when executed by the vehicle data processing module, cause the vehicle data processing module to carry out the following steps: generating occupancy grid data from the sensor data, the occupancy grid data includes a plurality of occupancy grids, each occupancy grid includes a plurality of individual cells, and each cell is assigned a probability that represents the likelihood that an object occupies a space associated with that particular cell; deriving correction data from the occupancy grid data; and determining corrected vehicle pose data from the correction data, wherein the corrected vehicle pose data is representative of a location and/or an orientation of the vehicle and has been corrected to address a drift or error in the vehicle pose data.

BRIEF DESCRIPTION OF THE DRAWINGS

One or more exemplary embodiments will hereinafter be described in conjunction with the appended drawings, wherein like designations denote like elements, and wherein:

FIGS. 3A-B illustrate uncorrected vehicle pose data that includes a drift or error and FIGS. 3C-3D illustrate corrected vehicle pose data where the drift or error has been addressed;

FIG. 6A is representative of a historic frame and FIG. 6B is representative of a candidate frame.

DETAILED DESCRIPTION OF THE ILLUSTRATED EMBODIMENT(S)

The vehicle pose determining system and method disclosed herein may be used to accurately estimate or otherwise determine the pose of a vehicle (i.e., the location and/or orientation of a vehicle). Many vehicles, such as autonomous vehicles, rely on vehicle pose data to carry out certain self-driving operations, and the performance of such operations may be impacted by the accuracy of the vehicle pose data. The present system and method use a form of sensor fusion, where output from vehicle dynamics sensors (e.g., accelerometers, gyroscopes, encoders, etc.) is used in conjunction with output from vehicle radar sensors to improve the accuracy of the vehicle pose data. According to one embodiment, uncorrected vehicle pose data derived from the vehicle dynamics sensors is compensated with correction data derived from occupancy grids that are created from the vehicle radar sensors. The occupancy grids, which are 2D or 3D mathematical objects that are somewhat like sensor-generated maps, must correspond to the same geographic location, but can have discrepancies due to slight differences in the vehicle pose at the time the occupancy grids were generated from the output of the vehicle radar sensors. The present method and system use mathematical techniques (e.g., cost functions, optimization problem solving, etc.) to rotate and shift the multiple occupancy grids until a best fit solution is determined, and the best fit solution is then used to derive the correction data that, in turn, improves the accuracy of the vehicle pose data. This will be explained below in more detail.

Figure 1:
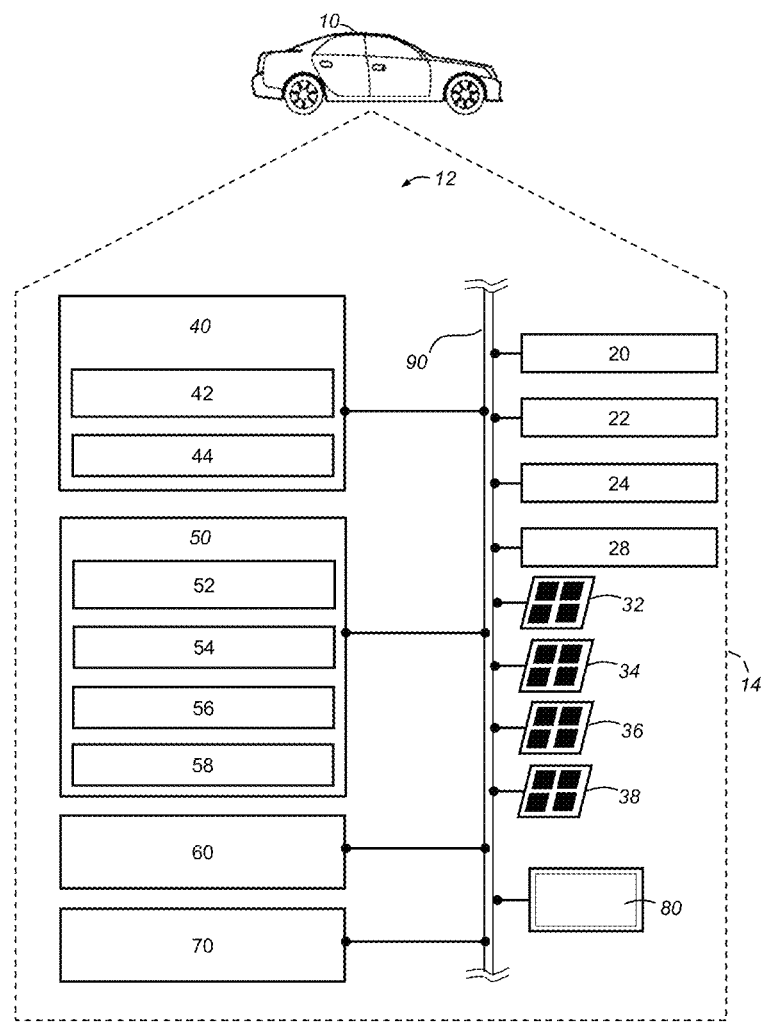
FIG. 1 is a schematic block diagram of an embodiment of a vehicle pose determining system installed on a vehicle.

Turning now to FIG. 1, there is shown an example of a vehicle 10 having a vehicle pose determining system 12 for accurately estimating a vehicle pose (i.e., the position and/or orientation of the vehicle), where the system is capable of carrying out the vehicle pose determining method described below. According to this example, system 12 includes vehicle hardware 14 that has one or more vehicle dynamics sensors 20-24, a vehicle global positioning sensor (GPS) 28, vehicle radar sensors 32-38, a vehicle data processing module 40, a vehicle communications module 50, a vehicle autonomous driving module 60, other vehicle electronic modules 70, a vehicle display 80, as well as any other suitable combination of systems, modules, devices, components, hardware, software, etc. that are needed to carry out the method, steps and/or functionality described herein. The various components of the vehicle hardware 14 may be connected by a vehicle communication network 90 (e.g., a wired vehicle communications bus, a wireless vehicle communications network, or some other suitable communications network). Vehicle 10 may be a traditional non-autonomous vehicle, a semi-autonomous vehicle, or an autonomous vehicle. The phrase "autonomous or semi-autonomous vehicle," as well as any derivative terms, broadly means any vehicle capable of automatically performing a driving-related action or function, without a driver request, and includes actions falling within levels 1-5 of the Society of Automotive Engineers (SAE) International classification system.

Skilled artisans will appreciate that the schematic block diagram of the vehicle hardware 14 is simply meant to illustrate some of the more relevant hardware components used with the present method and it is not meant to be an exact or exhaustive representation of the vehicle hardware that would typically be found on such a vehicle. Furthermore, the structure or architecture of the vehicle hardware 14 may vary substantially from that illustrated in FIG. 1 (e.g., vehicle dynamics sensors 20-24, vehicle GPS sensor 28, vehicle radar sensors 32-38, etc. could be integrated or otherwise combined with one other or with other equipment, as opposed to all being separate stand-alone components). Because of the countless number of potential arrangements and for the sake of brevity and clarity, the vehicle hardware 14 is described in conjunction with the illustrated embodiment of FIG. 1, but it should be appreciated that the present system and method are not limited to such.

Vehicle dynamics sensors 20-24 are mounted on the vehicle 10 and are coupled to the vehicle data processing module 40 so that they can provide the system with dynamics sensor data. Various types of vehicle dynamics sensors may be used to take linear, angular and/or other forms of vehicle dynamics measurements that, in turn, can be used to generate information pertaining to the vehicle's position and/or orientation (i.e., uncorrected vehicle pose data). According to one example, sensor 20 includes one or more accelerometers, sensor 22 includes one or more gyroscopes, and sensor 24 includes one or more encoders, such as the type that are electromagnetically or optically coupled to the vehicle wheels, and all of the sensors are coupled to the vehicle data processing module 40 via the vehicle communications bus 90. As is well known in the art, the vehicle dynamics sensors 20-24 may be individually packaged sensors, as schematically illustrated in FIG. 1, or they may be integrated into a larger device, module or system (i.e., an inertial movement unit (IMU), an antilock braking system (ABS), a vehicle stability control system, etc.). Other configurations and combinations of vehicle dynamics sensors, including ones with more or less sensors, different types of sensors, etc. are certainly possible.

Vehicle GPS sensor 26 is mounted on the vehicle 10 and is coupled to the vehicle data processing module 40 so that it can provide the system with GPS sensor data. According to one example, the vehicle GPS sensor 26 provides GPS sensor data that, along with the dynamics sensor data, can be used to determine a basic or coarse estimate of the vehicle pose (i.e., the vehicle location and/or orientation). This estimate may be provided in terms of x, y and/or z coordinates, heading, pitch and/or roll measurements, or any suitable combination thereof. The present system and method are not limited to any particular type of GPS sensor, as different types may be used.

Vehicle radar sensors 32-38 are mounted on the vehicle 10 and are coupled to the vehicle data processing module 40 so that they can provide the system with radar sensor data. According to one non-limiting example, the vehicle radar sensors include one or more forward looking sensor(s) 32, one or more rearward looking sensor(s) 34, and driver and passenger side looking sensors 36, 38, respectively. However, it should be appreciated that as little as one vehicle radar sensor may be used. Due to challenges with alignment and the like, it is sometimes preferable to use short-range radar sensors (i.e., range up to 20 m), however, there are other applications in which long-range radar sensors (i.e., range up to 100 m) are more appropriate. In other examples, the vehicle radar sensors 32-38 include any suitable combination of radar, LIDAR, ultrasonic and/or other types of suitable sensors. It is preferable that each of the vehicle radar sensors 32-38 be aligned to each other via a common frame of reference (FOR) and/or to a vehicle frame of reference (FOR). It should be recognized that the exact number, type, location, orientation, etc. of the vehicle radar sensors will largely be dictated by the application and requirements of the system and that sensors 32-38 are not limited to any specific embodiment, assuming that they can be used to generate occupancy grids, as explained below.

Vehicle data processing module 40, vehicle communications module 50, vehicle autonomous driving module 60, as well as the other vehicle electronic modules 70 may include any suitable components and be arranged according to any suitable configurations known or used in the industry. Because the particular architectures of modules 40-70 are not critical and because these modules can be provided according to so many different embodiments, the following description of components of module 40 can apply to any of the modules 40-70, except for where stated otherwise. For instance, each of the modules 40-70 may include one or more processing device(s) 42, memory device(s) 44, I/O device(s), as well as any other hardware and/or software typically found on such modules. The processing device 42 can be any type of device capable of processing electronic instructions including microprocessors, microcontrollers, host processors, controllers, vehicle communication processors, General Processing Unit (GPU), accelerators, Digital Signal Processors (DSPs), Field Programmable Gated Arrays (FPGA), and Application Specific Integrated Circuits (ASICs), to cite a few possibilities. It can be a dedicated processor used only for module 40 or can be shared with other vehicle systems, modules, devices, components, etc. The processing device 42 can execute various types of electronic instructions, such as software and/or firmware programs stored in the memory device 44, which enable the module 40 to carry out various functionality. The memory device 44 can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. In one example, the processing device 42 executes programs or processes data and the memory device 44 stores programs or other data in order to help carry out or support at least a part of the present method.

Vehicle data processing module 40 receives dynamics sensor data from one or more vehicle dynamics sensors 20-24, GPS sensor data from vehicle GPS sensor 28 and radar sensor data from one or more vehicle radar sensors 32-38, and may be configured to evaluate, analyze and/or otherwise process this input before providing corrected vehicle pose data as output, as explained below. Vehicle data processing module 40 may be indirectly or directly connected to vehicle dynamics sensors 20-24, to vehicle GPS sensor 28, and/or to vehicle radar sensors 32-38, as well as to any combination of the other modules 50-70 (e.g., via vehicle communications network 90). It is possible for the vehicle data processing module 40 to be integrated or combined with the vehicle dynamics sensors 20-24, the vehicle GPS sensor 28, the vehicle radar sensors 32-38 and/or the vehicle display 80 so that they are part of a single packaged module or unit, or it is possible for the module 40 to be combined with any number of other systems, modules, devices and/or components in the vehicle.

Vehicle communications module 50 provides the vehicle with short range and/or long range wireless communication capabilities so that the vehicle can communicate and exchange data with various devices and systems, including other vehicles or a back-end or cloud-based facility used with autonomous or semi-autonomous vehicles, for example. For instance, vehicle communications module 50 may include a short range wireless circuit that enables short range wireless communications (e.g., Bluetooth™, other IEEE 802.15 communications, Wi-Fi™, other IEEE 802.11 communications, vehicle-to-vehicle communications, etc.). Module 50 may also include a cellular chipset and/or a vehicle telematics unit that enables long range wireless communications with a back-end facility or other remotely located entity (e.g., cellular, telematics communications, etc.). According to one non-limiting example, the vehicle communications module 50 includes processing and memory devices 52, 54, similar to those mentioned above, a short range wireless circuit 56, a long range wireless circuit 58 in the form of a cellular chipset, and one or more antenna(s). Vehicle communications module 50 may be indirectly or directly connected to vehicle dynamics sensors 20-24, to vehicle GPS sensor 28, to vehicle radar sensors 32-38 and/or to vehicle display 80, as well as any combination of the other modules 40, 60, 70 (e.g., via vehicle communications network 90). It is possible for the module 50 to be combined with any number of other systems, modules, devices and/or components in the vehicle.

Vehicle autonomous driving module 60 is an optional component and provides the vehicle with autonomous and/or semi-autonomous driving capabilities and, depending on the particular embodiment, may be a single module or unit or a combination of modules or units. The particular arrangement, configuration and/or architecture of the vehicle autonomous driving module 60 is not imperative, so long as the module helps enable the vehicle to carry out autonomous and/or semi-autonomous driving functions. Vehicle autonomous driving module 60 may be indirectly or directly connected to vehicle dynamics sensors 20-24, to vehicle GPS sensor 28, to vehicle radar sensors 32-38 and/or to vehicle display 80, as well as any combination of the other modules 40, 50, 70 and various vehicle actuators (e.g., via vehicle communications network 90). It is possible for the module 60 to be combined with any number of other systems, modules, devices and/or components in the vehicle or, in the alternative, for module 60 to be omitted altogether (as mentioned above, this is an optional component).

Vehicle electronic modules 70 may include any other suitable modules needed to help implement the present method. For instance, module 70 may include any combination of an infotainment module, a powertrain control module (PCM), an engine control module (ECM), a transmission control module (TCM), a body control module (BCM), a traction control or stability control module, a cruise control module, a steering control module, a brake control module, etc. As with the previous modules, vehicle electronic module 70 may be indirectly or directly connected to vehicle dynamics sensors 20-24, to vehicle GPS sensor 28, to vehicle radar sensors 32-38 and/or to vehicle display 80, as well as any combination of the other modules 40, 50, 60 and various vehicle actuators (e.g., via vehicle communications network 90). According to one non-limiting example, vehicle electronic module 70 includes an engine control module, a steering control module and/or a brake control module and is coupled to one or more vehicle actuator(s) (e.g., a vehicle actuator that drives or controls an engine component, a steering component and/or a brake component) so that the vehicle electronic module can automatically control the vehicle actuator(s) with instructions based on corrected vehicle pose data, as will be explained. It is possible for the module 70 to be combined with any number of other systems, modules, devices and/or components in the vehicle.

Figure 2:
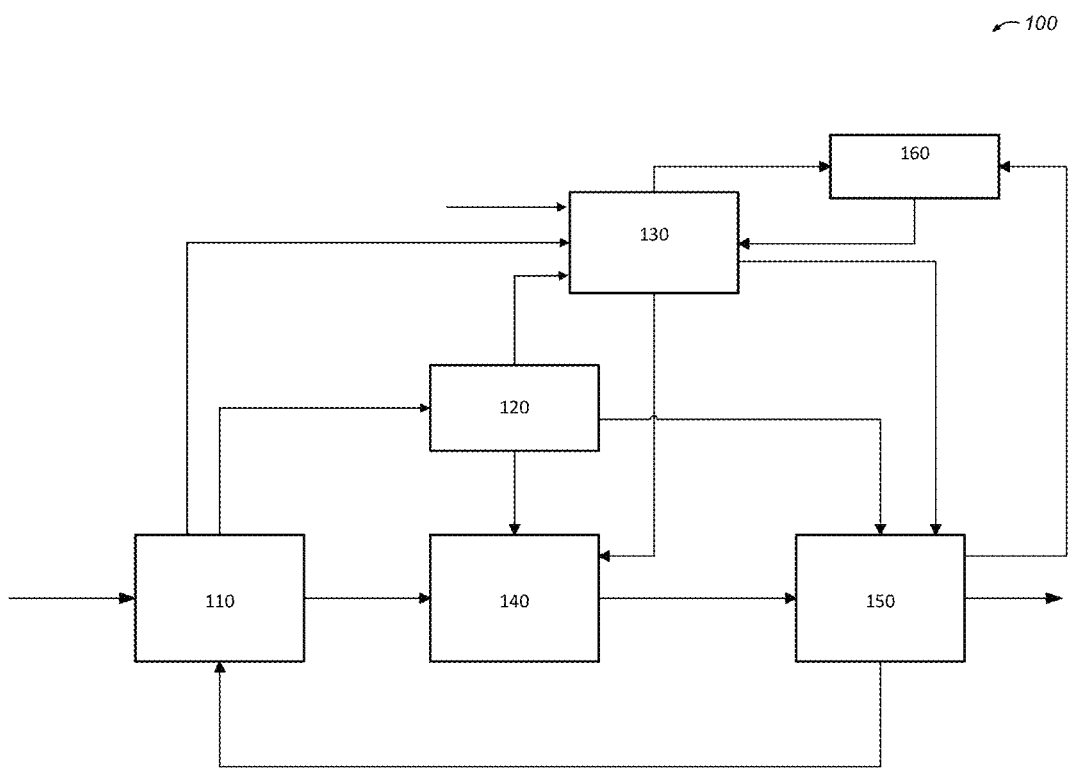
FIG. 2 is a schematic block diagram of an embodiment of a vehicle pose determining method that may be used with the system of FIG. 1.

Turning now to the block diagram of FIG. 2, there is shown an example of a vehicle pose determining method 100 that uses correction data derived from radar-based occupancy grids to improve the accuracy of a vehicle pose estimate.

Figure 3A:
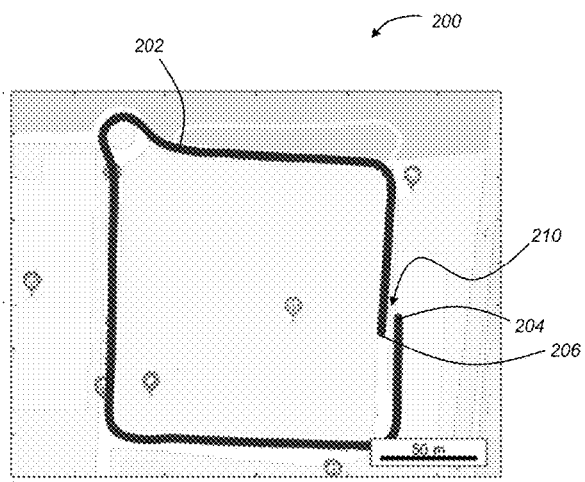
FIGS. 3A-3D are schematic illustrations of maps showing potential vehicle routes, where

Starting with step 110, the method estimates the vehicle pose using data from one or more sources. In this paragraph, step 110 is described in the context of the first cycle or iteration of method 100 (before the generation of correction data), such that the vehicle pose data generated here is uncorrected. Later in the description, step 110 will be described in the context of subsequent cycles or iterations (after the generation of correction data), such that the vehicle pose data generated then is corrected. According to one non-limiting example, step 110 receives dynamics sensor data from sensors 20-24 (and optionally GPS sensor data from sensor 28) and uses this information to estimate the geographic location and/or the physical orientation of the vehicle (i.e., the vehicle pose). During the first cycle or iteration of method 100, the estimated vehicle pose can be outputted by step 110 in the form of uncorrected vehicle pose data (for 2D applications, this data may include x, y and heading (yaw) information; for 3D applications, this data may include x, y, z, heading (yaw), pitch and roll information) and can be sent to steps 120, 130 and 140. By using both dynamics sensor data and GPS sensor data, the method may be able to correct for major navigation drifts at step 110, but there is still likely to be the issue of minor navigation drifts that can accumulate over time. Consider the example illustrated in FIG. 3A, where a navigational map 200 is shown with a vehicle route 202 that extends between a starting location 204 and an ending location 206 and generally follows the actual route or path traversed by vehicle 10. If the current vehicle pose is largely determined based on dynamics sensor data from sensors 20-24, with some minor corrections possibly provided by the GPS sensor data, then a drift or error 210 can accumulate and build over time. The drift 210 generally represents the error between the actual pose of the vehicle and the estimated pose of the vehicle; the estimated pose here is an initial estimate of the vehicle pose before it has been corrected, as will be explained. In some instances, the drift 210 is exacerbated by phenomena such as Simultaneous Localization and Mapping (SLAM) and the like, as understood by skilled artisans. The present system and method are designed to address and minimize this drift and, thereby, more accurately determine the vehicle pose.

In step 120, the method builds one or more occupancy grids using radar sensor data from one or more vehicle radar sensors. More specifically, the method emits radar signals from the vehicle radar sensors 32-38; receives reflected radar signals; evaluates, analyzes and/or otherwise interprets the reflected radar signals to determine the probability that objects occupy certain areas near the vehicle; and then uses the various probabilities to build or generate an occupancy grid. The term "occupancy grid," as used herein, broadly refers to a 2D or 3D mathematical structure or object that is built from the output of one or more sensors (e.g., vehicle radar sensors) and includes a number of individual cells, where each cell is assigned a probability (e.g., number between 0 and 1) that represents the likelihood that an object occupies that cell. In the case of a 2D occupancy grid, the probability associated with each cell represents the likelihood that an object occupies the corresponding area around the vehicle; in a 3D occupancy grid, the probability represents the likelihood that an object occupies the corresponding volume surrounding the vehicle. In this way, occupancy grids are like radar-generated maps of the area or volume surrounding the vehicle, but instead of containing images, they may contain mathematical distributions of probabilities. Although the following description assumes that the occupancy grids are built from radar sensors, it should be recognized that they could instead be built from ultrasonic or other sensors and that the present invention is not limited to occupancy grids based on radar sensor data.

Figure 4A:
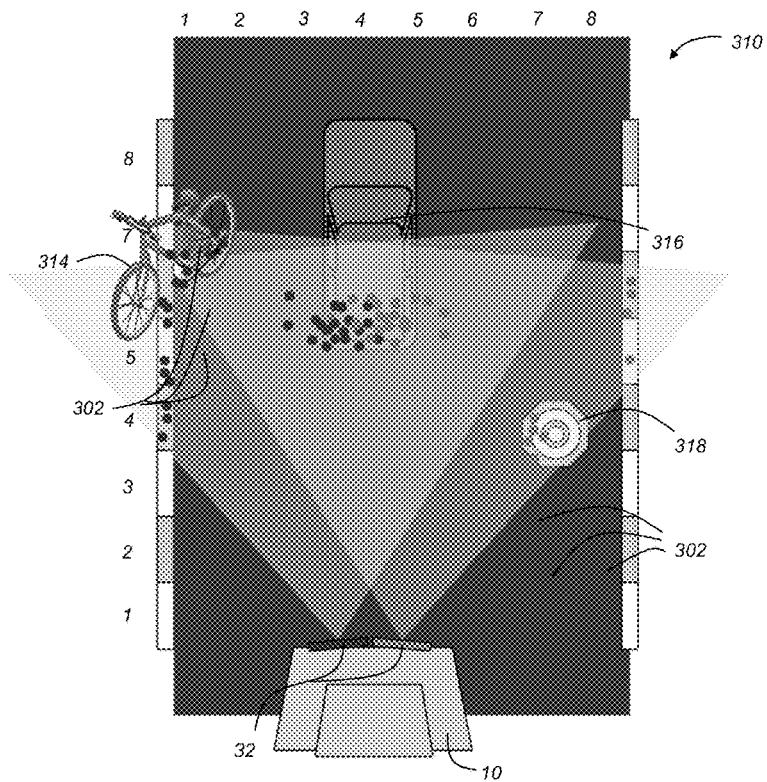
FIGS. 4A-4B are schematic illustrations of a potential process for generating radar-based occupancy grids and may be used with the method of FIG. 2.
Figure 4B:
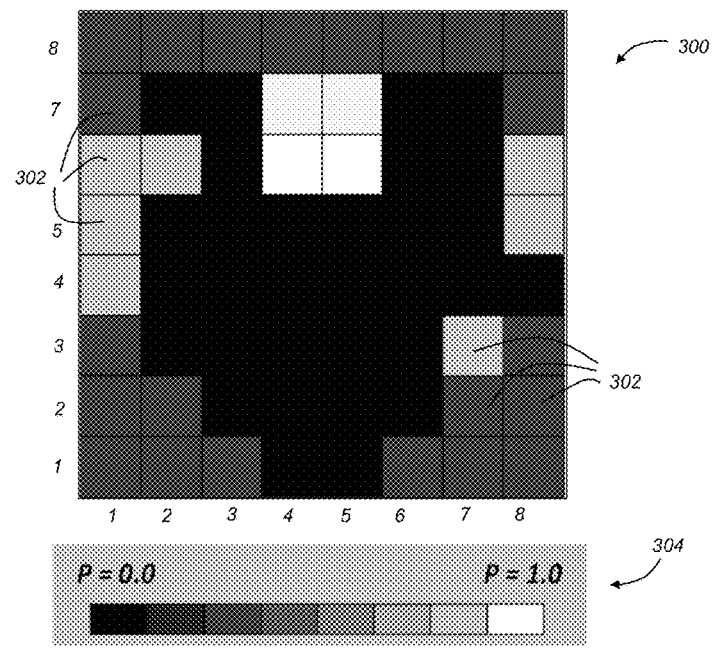

With reference to FIGS. 4A-B, there is shown a basic illustration of how an occupancy grid 300 may be built from radar sensor data from vehicle radar sensors 32 in order to mathematically represent the scene 310 in front of vehicle 10. In this non-limiting example, the occupancy grid 300 in FIG. 4B includes eight columns of cells and eight rows of cells for a total of sixty-four individual cells 302. Each of the individual cells 302 corresponds to a particular area or space 312 in the scene 310, as demonstrated in FIG. 4A, and will be assigned a probability; in this way, the occupancy grid 300 is a statistical way of describing the scene 310. According to one technique for building and/or populating the occupancy grid 300, each of the cells 302 is initially assigned a predetermined or initial probability (e.g., without any radar sensor data yet, the method may assume there is a 50% chance that the corresponding area 312 is occupied with an object, hence, a probability of 0.5 could be assigned; of course, other initial probabilities may be assigned instead). As step 120 gathers radar sensor data from radar sensors 32 (i.e., radar signals that have been reflected off of objects 314-318 and have been evaluated by the system), the method begins to adjust the probabilities of the various cells 302 up or down, based on the radar sensor data. If both radar sensors 32 confirm that an object 316 appears to be located in the space associated with columns 4-5 and rows 6-7 in FIG. 4A and those confirmations are conclusive, for instance, then the method would assign a high probability to the corresponding cells 302 in FIG. 4B (e.g., each of those cells may be assigned a probability of 1.0, as illustrated by the color according to the probability/color scale 304). If, on the other hand, only one of the two radar sensors 32 confirms the presence of object 318 or if both radar sensors detect an object 314, but the signals are noisy or less conclusive, then the method may assign a probability of 0.7 or 0.8, for example. For other spaces, such as those in front of the vehicle where both radar sensors 32 conclude that there are no objects, the method assigns a low probability of 0.0 or 0.1. For ease of understanding, the occupancy grid 300 is shown terms of different color cells to demonstrate a probability distribution, but could just as easily be represented through other mathematical and/or data structures, etc. The occupancy grids of the present application are not limited to any particular form, structure, arrangement, etc.

The occupancy grid 300 shown in FIG. 4B is representative of a single data frame; that is, it is representative of the radar sensor data from a single snapshot in time. As the vehicle 10 drives along the vehicle path or route 202, more radar sensor data is gathered and processed so that additional occupancy grid data frames are generated. For example, it is possible for the method to generate a new occupancy grid data frame on a periodic basis (e.g., new data frame every 1 msec, 1 sec, 10 sec, etc.), on a distance basis (e.g., new data frame every 0.1 m, 1 m, 10 m, etc.), or according to some other basis. In this sense, the occupancy grid(s) generated by the method may act as a smart aggregation of potentially noisy measurements, so that over time, they can result in a single map representation. According to one embodiment, step 120 outputs occupancy grid data to steps 130 and 140 in the form of individual or single data frames (e.g., a local frame of reference for just the scene currently in front of the vehicle), and outputs occupancy grid data to step 150 in the form of aggregated data frames (e.g., a global frame of reference for an entire vehicle path or route). For more information regarding potential techniques for building or generating occupancy grids or other related matters, please see U.S. application Ser. No. 15/976,205 assigned to the same assignee as the present application.

In step 130, the method saves the various occupancy grid data frames to memory. Skilled artisans will appreciate that there are many suitable ways and techniques for carrying out this step, any of which may be used here. According to one possible way, step 130 receives occupancy grid data from step 120 and saves the occupancy grid data (whether it be in the form of individual or aggregate occupancy grid data or both) at the memory device 44 in the vehicle data processing module 40.

In step 140, the method looks for occupancy grid data that is a good candidate for generating correction data. In order for the method to generate correction data from the radar-based occupancy grids, the method must first identify two or more occupancy grid data frames that are representative of the same geographic location or scene and, preferably, are only slightly different from one another. Consider the example in FIG. 3A, where vehicle 10 begins at the starting location 204, travels the vehicle route 202, and arrives at the ending location 206, which is erroneously shown in the navigational map 200 as being shifted from the original starting location 204 by a drift 210. In this type of example, the method recognizes that there is a drift or error 210 between where the uncorrected vehicle pose data (i.e., data based on odometry- and/or GPS-based equipment) indicates the vehicle is located and where the vehicle is actually located. Thus, the method tries to close this loop (i.e., loop closure). At or around the ending location 206, the method recognizes that the vehicle is now traveling over a section of the vehicle route 202 that has already been traversed, so it starts to evaluate new occupancy grid data coming in from step 120 against historic or stored occupancy grid data from step 130. When two or more occupancy grid data frames appear to be very similar to one another (suggesting that they were generated from the same vehicle location and/or orientation (i.e., the vehicle pose)), the method may identify these data frames as good candidates for generating correction data.

Figure 5:
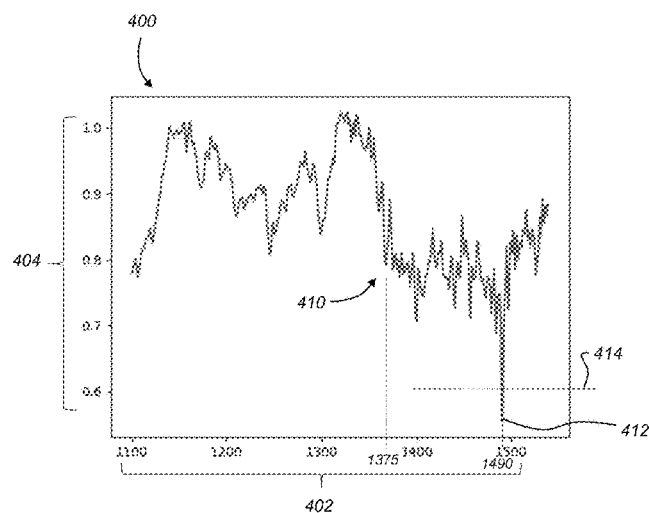
FIG. 5 is a graphic illustration of a potential process for determining which radar-based occupancy grids are good candidates for deriving correction data and may be used with the method of FIG. 2.
Figure 6A:
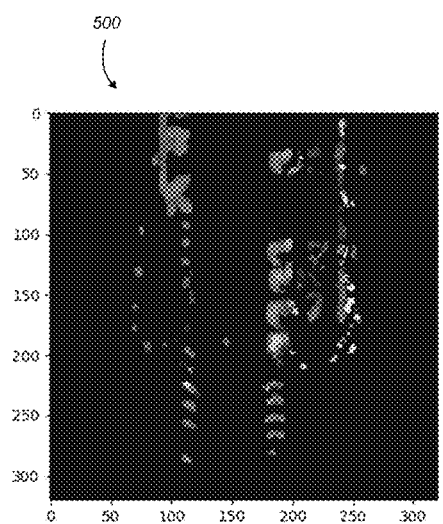
FIGS. 6A-6B are images of radar-based occupancy grids that are good candidates for deriving correction data and may be used with the method of FIG. 2, where
Figure 6B:
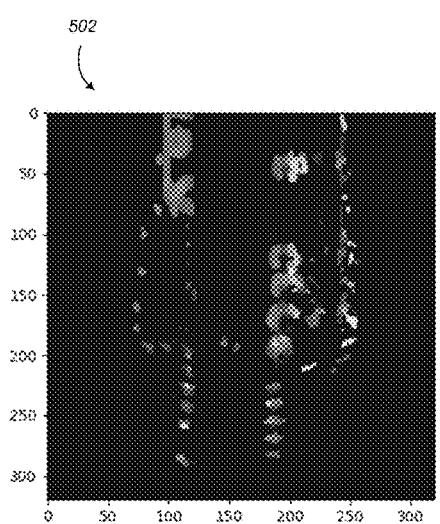

One possible technique for determining which occupancy grid data frames constitute "good candidates" for deriving correction data is illustrated in FIG. 5, which is a graph 400 that shows an occupancy grid data frame number 402 on the x-axis and the inverse degree of occupancy grid data frame correlation 404 on the y-axis (the greater the data frame correlation (i.e., the more similar two data frames are), the smaller the correlation value and vice-versa). As the vehicle 10 is driven, it is generating new occupancy grid data, is comparing that data to previously stored occupancy grid data, and is looking for matches or near matches. Assume that data frame 1375 is the one-thousand, three-hundred and seventy-fifth occupancy grid data frame gathered and saved by the method as the vehicle travels around route 202, for example, and that data frame 1375 corresponds to the ending location 206. Once the vehicle passes the ending location 206, it starts traveling along its previous route and encounters familiar scenes for which it has already generated occupancy grid data frames. This is why the occupancy grid data frame correlation 404 generally drops so much around point 410 (it is an inverse value, as stated above), as the method starts comparing occupancy grid data frames for the same geographic location. Even though the occupancy grid data frame correlation is stronger after point 410, there may still be substantial differences in the data frames being compared that may prevent them from being good candidates. For instance, even if two occupancy grid data frames were generated from the exact same location, there could have been parked cars, pedestrians, etc. in one of the frames that are not present in the other frame, thus, causing a weaker correlation. When step 140 encounters data frame 1490, for example, the strong correlation between that data frame (e.g., frame 502 in FIG. 6B, also referred to as a "candidate frame") and a saved data frame from step 130 (e.g., frame 500 in FIG. 6A, also referred to as a "historic frame") is clearly demonstrated in the graph, as point 412 satisfies a correlation threshold 414. This is also confirmed by the clear similarity of those two data frames, as visually demonstrated by comparing FIGS. 6A to 6B. This informs the method that good candidates for determining correction data have been found and will be provided to step 150 in the form of initial correction data. Any suitable techniques for determining occupancy grid data frames registration may be used, including maximization of Normalized Cross Correlation (NCC) or of Mutual Information, minimization of Sum of Square Distances (SSD) or of Sum of Absolute Distances (SAD), etc.

Figure 3B:
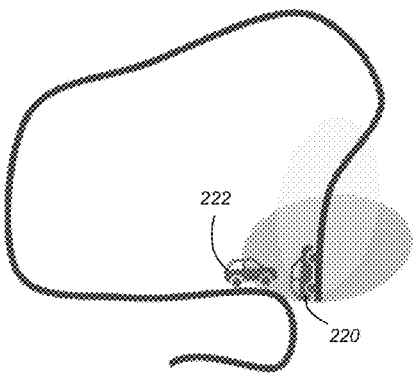

It should be pointed out that step 140 may be executed or carried out according to a number of different embodiments, techniques, algorithms, circumstances, etc. For instance, the method may decide to perform step 140 whenever a loop closure is detected, whenever the occupancy grid data frame correlation satisfies a correlation threshold, or some other condition. It should also be pointed out that it is not necessary for vehicle 10 to have the exact same pose (location and/orientation) as at a previous time in order for the corresponding occupancy grid data frames to be good candidates. With reference to FIG. 3B, there is shown an example where step 140 could use occupancy grid data frames gathered from locations 220 and 222, even though the orientation or heading of the vehicle 10 in those locations is substantially different. That is because the method may algorithmically rotate or manipulate the corresponding occupancy grid data frames before the evaluating them for correlation. This is possible so long as the two occupancy grids in question both include at least some of the same overlapping scenes. In another embodiment, step 140 may selectively identify one or more historic occupancy grid data frames from memory and may do so based on factors such as vehicle location. As demonstrated by the preceding examples, the present method may be opportunity-oriented when it comes to comparing occupancy grid data frames for good potential candidates and is not necessarily limited to any particular technique.

In step 150, the method uses the candidate and historic frames that were previously identified as good candidates to derive certain types of correction data. This step may be carried out according to a number of different embodiments. In one such embodiment, the method mathematically manipulates the candidate and historic frames (i.e., occupancy grid data frames that have already been determined to pertain to the same geographic location or scene) to determine a distance correction (also known as a translational correction) and/or a rotational correction between the frames that represents a best fit. In step 140 the method considers two or more occupancy grid data frames (e.g., historic and candidate frames) and determines if they are similar enough to be good candidates, whereas in step 150 the method determines the best or most optimal translational and rotational correction by solving an optimization problem (the cost function mentioned herein, examples of which are described below, is the objective function to be minimized over all possible translations and rotations (e.g., can be three or six degrees of freedom, depending if the occupancy grids are in 2D or 3D)). The best solution to this optimization problem is the translational and/or rotational shift that constitutes the correction data. According to a non-limiting example, step 150 may use one or more of the following measure or cost functions (e.g., d(u,v)) to calculate a translational and/or rotational translation or shift between the candidate and historic frames that constitutes a best fit. Any combination of the following exemplary cost functions may be used:

normalized cross correlation (NCC)—

$$d_1(u, v) = 1 - \langle u, v \rangle = 1 - \frac{1}{n\sigma_v\sigma_u}\sum_{i=1}^{n}(v_i - \bar{v})(u_i - \bar{u})$$

$$\sigma_v = \sqrt{\frac{1}{n}\sum_{i=1}^{n}(v_i - \bar{v})^2}$$

$$\bar{v} = \frac{1}{n}\sum_{i=1}^{n}v_i$$

sum of square distances (SSD)—

$$d_2(u, v) = \frac{1}{n}\sum_{i=1}^{n}(v_i - u_i)^2$$

sum of absolute distances (SAD)—

$$d_3(u, v) = \frac{1}{n}\sum_{i=1}^{n}|v_i - u_i|$$

Figure 7:
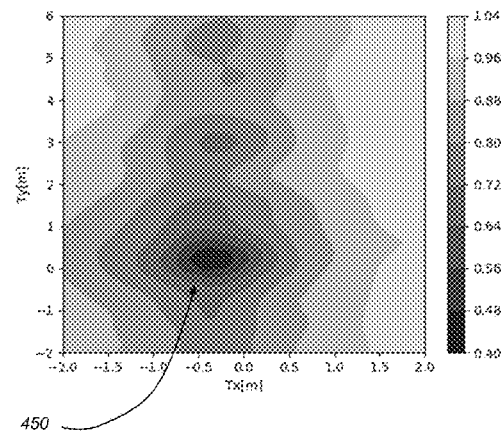
FIG. 7 is graphic illustration of a cost function over a 2D translation that is part of a potential process for deriving correction data and may be used with the method of FIG. 2.

With reference to FIG. 7, there is a shown an illustration of how the aforementioned cost functions may be minimized in step 150 and, more specifically, FIG. 7 illustrates a cost function over a 2D translation (graphic limitations limit this illustration to x and y only). In this graph, solution 450 represents a translational correction (i.e., a translation or shift) that minimizes the distance error between the candidate and historic occupancy grid frames. Stated differently, if the candidate and historic frames were shifted by the solution 450 (e.g., by a translational correction of x meters by y meters), then the two occupancy grids would correspond very tightly to one another. In this illustrative example, the rotational correction or heading of the vehicle has been ignored so that the translational correction can better explained, however, it should be appreciated that step 150 may also solve for a rotational best fit, a velocity best fit, an acceleration best fit, a yaw best fit, etc. As mentioned previously, the occupancy grid data (and hence the best fit solution) may be in two-dimensions (2D) or three dimensions (3D). Cost minimization in step 150 may be carried out using any suitable nonlinear optimization procedure or technique.

Figure 3C:
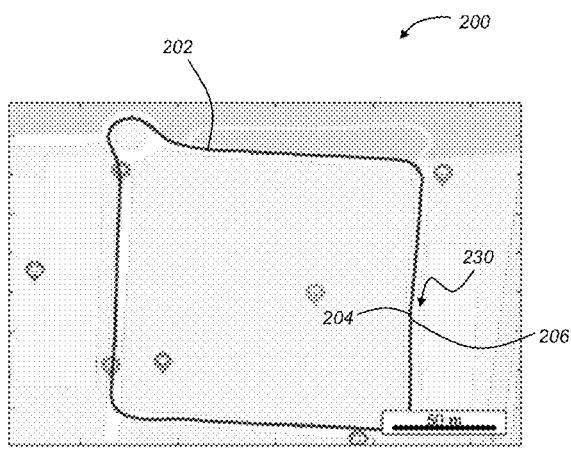
Figure 3D:
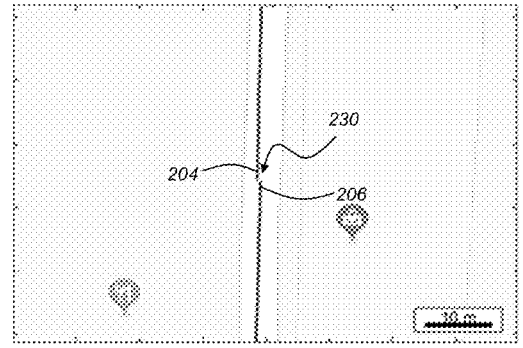

Once the method has derived or otherwise generated the correction data, the method may loop back to step 110 so that a corrected vehicle pose can be determined. The method applies the correction data to the vehicle pose estimate that was generated the previous time it executed step 110 (e.g., uncorrected vehicle pose data) to generate an updated, more accurate vehicle pose estimate (e.g., corrected vehicle pose data) that reduces or eliminates the drift or error 210. This process is schematically illustrated in the maps in FIGS. 3C and 3D, where it can be seen that after the distance translation that is embodied in the correction data has been applied to the previous vehicle pose estimate, the drift 230 is substantially reduced, if not eliminated. If the correction data includes a translational correction in the form of x, y coordinate shifts, then these adjustments can be applied to the x, y coordinates of the previous vehicle pose estimate. If the correction data includes rotational corrections, then such adjustments may be applied in any suitable way. This process may continue such that after the next cycle or iteration of method 100, step 150 will send new correction data back to step 110, such that the vehicle pose estimate is again updated (in this example, the correction data can be thought of as updating "uncorrected vehicle pose data," since the vehicle pose data would not be updated and would be uncorrected at that time).

It is also possible for the method to send the correction data and/or the corrected vehicle pose data to step 160, where it could be used for purposes of occupancy grid history correction, as well as to step 130 for saving the correction data in memory or to other steps. Other embodiments are certainly possible as well.

Once the method has generated the corrected vehicle pose data, the method may automatically control one or more vehicle actuator(s) with a vehicle electronic module according to instructions based on the corrected vehicle pose data. For example, vehicle electronic module 70 may include an engine control module, a steering control module and/or a brake control module and can be coupled to one or more vehicle actuator(s) (e.g., a vehicle actuator that drives an engine component, a steering component and/or a brake component). In this arrangement, the vehicle electronic module 70 may automatically control the vehicle actuator(s) with instructions based on corrected vehicle pose data. This application of corrected vehicle pose data may be particularly well suited for autonomous vehicles when carrying out self-driving operations, although it is not limited to such.

Although method 100 has been illustrated with a certain sequence of steps, it should be appreciated that the exact order or sequence of these steps may vary. For example, it is possible for the method to gather dynamics/GPS sensor data and/or radar sensor data before, after or during the execution of the other method steps. The present method is not limited any particular sequence or combination of steps, and the present method may include more, less or different steps than those shown and described.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A vehicle pose determining method for use with a vehicle having one or more vehicle sensor(s), the method comprising the steps of:
    gathering sensor data from the vehicle sensor(s);
    generating occupancy grid data from the sensor data, the occupancy grid data includes a plurality of occupancy grids, each occupancy grid includes a plurality of individual cells, and each cell is assigned a probability that represents the likelihood that an object occupies a space associated with that particular cell;
    computing a correlation score between the occupancy grid and a plurality of historic occupancy grids that are captured at earlier timepoints;
    identifying two or more historic occupancy grids, by determining that the correlation score associated with the two or more historic occupancy grids satisfy a correlation threshold, respectively;
    deriving correction data from the occupancy grid data and the two or more historic occupancy grids; and
    determining corrected vehicle pose data from the correction data, wherein the corrected vehicle pose data is representative of a location and/or an orientation of the vehicle and has been corrected to address a drift or error in the vehicle pose data.

2. The method of claim 1, wherein the gathering step further comprises gathering radar sensor data from one or more vehicle radar sensor(s) and providing the radar sensor data to a vehicle data processing module over a vehicle communications network, and the radar sensor data includes information relating to radar signals that have been reflected off of one or more object(s) near the vehicle.

3. The method of claim 1, wherein the generating step further comprises generating occupancy grid data from the sensor data and storing the occupancy grid data including the plurality of occupancy grids in a memory device located on the vehicle, and each occupancy grid is a 2D or 3D mathematical structure or object that includes a distribution of probabilities representative of a scene near the vehicle.

4. The method of claim 3, wherein the generating step further comprises assigning an initial probability to each of the plurality of individual cells, and then adjusting the initial probability of each cell up or down based on whether the sensor data indicates that it is more likely or less likely that an object occupies the space associated with that particular cell.

5. The method of claim 1, wherein the two or more historic occupancy grids are representative of the same geographic location or scene and are candidates for deriving the correction data.

6. The method of claim 1, wherein the deriving step further comprises finding a mathematical solution that represents the least amount of error between the two or more historic occupancy grids that are representative of the same geographic location or scene, and using the solution to derive the correction data.

7. The method of claim 6, wherein the deriving step uses optimization problem solving techniques with a cost function to find the mathematical solution that represents the least amount of error between the two or more occupancy grids, and the cost function is selected from the group consisting of: a normalized cross correlation (NCC) cost function, a sum of square distances (SSD) cost function, or a sum of absolute distances (SAD) cost function.

8. The method of claim 6, wherein the correction data includes a translational correction, a rotational correction, or both.

9. The method of claim 1, wherein the determining step further comprises determining corrected vehicle pose data by applying the correction data to a previous vehicle pose estimate that is based on the occupancy grid.

10. The method of claim 9, wherein the corrected vehicle pose data includes a smaller drift or error than the previous vehicle pose estimate.

11. The method of claim 1, further comprising the steps of:
gathering dynamics sensor data with one or more vehicle dynamics sensor(s); and
estimating an initial vehicle pose from the dynamics sensor data, and the initial vehicle pose estimate is provided in the form of uncorrected vehicle pose data;
wherein the determining step further comprises determining corrected vehicle pose data by applying the correction data to the uncorrected vehicle pose data.

12. The method of claim 11, wherein the dynamics sensor data gathering step further comprises gathering dynamics sensor data from the vehicle dynamics sensor(s) and providing the dynamics sensor data to a vehicle data processing module over a vehicle communications network, and the dynamics sensor data includes information relating to linear, angular and/or other forms of vehicle dynamics measurements.

13. The method of claim 12, wherein the vehicle dynamics sensor(s) include at least one sensor selected from the group consisting of: an accelerometer, a gyroscope, or an encoder.

14. The method of claim 11, wherein the method uses sensor fusion to combine the dynamics sensor data with the sensor data in order to reduce the drift or error in the vehicle pose data.

15. The method of claim 1, further comprising the step of:
automatically controlling one or more vehicle actuator(s) with a vehicle electronic module, wherein the vehicle electronic module controls the vehicle actuator(s) with instructions based on the corrected vehicle pose data.

16. The method of claim 15, wherein the vehicle electronic module is selected from the group consisting of: an engine control module, a steering control module, or a brake control module.

17. A vehicle pose determining method for use with a vehicle having one or more vehicle dynamics sensor(s), one or more vehicle radar sensor(s) and a data processing module, the method comprising the steps of:
gathering dynamics sensor data with the vehicle dynamics sensor(s);
estimating an initial vehicle pose from the dynamics sensor data, and providing the initial vehicle pose estimate to the data processing module in the form of uncorrected vehicle pose data;
gathering radar sensor data with the vehicle radar sensor(s);
sending the radar sensor data to the data processing module;
generating occupancy grid data from the radar sensor data at the data processing module, the occupancy grid data includes a plurality of occupancy grids, each occupancy grid includes a plurality of individual cells, and each cell is assigned a probability that represents the likelihood that an object occupies a space associated with that particular cell;
computing a correlation score between the occupancy grid and a plurality of historic occupancy grids that are captured at earlier timepoints;
identifying two or more historic occupancy grids, by determining that the correlation score associated with the two or more historic occupancy grids satisfy a correlation threshold, respectively;
deriving correction data from the occupancy grid data and the two or more historic occupancy grids at the data processing module; and
determining corrected vehicle pose data from the correction data, wherein the corrected vehicle pose data is representative of a location and/or an orientation of the vehicle and has been corrected to address a drift or error in the vehicle pose data.

18. A vehicle pose determining system for use with a vehicle, comprising:
one or more vehicle sensor(s) that are mounted on the vehicle and provide sensor data;
a vehicle data processing module that is mounted on the vehicle and is coupled to the vehicle sensor(s) to receive the sensor data; and
a computer program product configured for installation on the vehicle data processing module, wherein the computer program product includes electronic instructions that, when executed by the vehicle data processing module, cause the vehicle data processing module to carry out the following steps:
generating occupancy grid data from the sensor data, the occupancy grid data includes a plurality of occupancy grids, each occupancy grid includes a plurality of individual cells, and each cell is assigned a probability that represents the likelihood that an object occupies a space associated with that particular cell;
computing a correlation score between the occupancy grid and a plurality of historic occupancy grids that are captured at earlier timepoints;
identifying two or more historic occupancy grids, by determining that the correlation score associated with the two or more historic occupancy grids satisfy a correlation threshold, respectively;

deriving correction data from the occupancy grid data and the two or more historic occupancy grids; and determining corrected vehicle pose data from the correction data, wherein the corrected vehicle pose data is representative of a location and/or an orientation of the vehicle and has been corrected to address a drift or error in the vehicle pose data.

19. The vehicle pose determining system of claim 18, wherein the electronic instructions, when executed by the vehicle data processing module, cause the vehicle data processing module to further carry out the following steps:

gathering dynamics sensor data with one or more vehicle dynamics sensor(s); and estimating an initial vehicle pose from the dynamics sensor data, and the initial vehicle pose estimate is provided in the form of uncorrected vehicle pose data;

wherein the determining step further comprises determining corrected vehicle pose data by applying the correction data to the uncorrected vehicle pose data.

* * * * *